United States Patent [19]
Yokota

[11] Patent Number: 5,803,620
[45] Date of Patent: Sep. 8, 1998

[54] ROLLER AND CAGE ASSEMBLY

[75] Inventor: Yasunori Yokota, Kanagawa-ken, Japan

[73] Assignee: Nippon Thompson Co., Ltd., Tokyo, Japan

[21] Appl. No.: 722,113

[22] PCT Filed: Feb. 5, 1996

[86] PCT No.: PCT/JP96/00231

§ 371 Date: Feb. 13, 1997

§ 102(e) Date: Feb. 13, 1997

[87] PCT Pub. No.: WO96/24778

PCT Pub. Date: Aug. 15, 1996

[30] Foreign Application Priority Data

Feb. 8, 1995 [JP] Japan .................................. 7-043447

[51] Int. Cl.$^6$ ........................................................ F16C 33/46
[52] U.S. Cl. .................................................................. 384/580
[58] Field of Search .................................. 384/580, 578, 384/576, 572, 573

[56] References Cited

U.S. PATENT DOCUMENTS 3,494,684 2/1970 Benson .................................. 384/580
5,540,506 7/1996 Yokota et al. ......................... 384/580
5,584,583 12/1996 Hidano .................................. 384/580

*Primary Examiner*—Lenard A. Footland
*Attorney, Agent, or Firm*—Sughrue, Mion, Zinn, Macpeak & Seas, PLLC

[57] ABSTRACT

The present invention discloses a roller and cage assembly that inhibits generation of heat and in turn, prevents the occurrence of seizure, thereby attaining a long service life while also offering various other advantages.

By cutting away the outside of a cage (1) in order to completely remove indentations (1$j$) formed during machining of outer retaining projections, the outer surface of those outer retaining projections (1$h_1$) is made to coincide with the normal diameter ($D_0$) of the cage (1). As a result of employing this constitution, even if the roller guide surfaces of the columns (1$c$) of the cage (1) become worn, the rollers (2) do not make contact with the outer retaining projections (1$h_1$). In addition, since the above-mentioned indentations do not remain, the contact surface area with an attaching partner is increased, thereby reducing contact pressure, thereby allowing the object described above to be attained.

4 Claims, 10 Drawing Sheets

ROLLER AND CAGE ASSEMBLY

TECHNICAL FIELD

The present invention relates to a roller and cage assembly, and more particularly, to a roller and cage assembly that attains long service life.

BACKGROUND ART

Roller and cage assemblies that took advantage of characteristics such as being lightweight, having a small cross-sectional height, large load capacity, high rigidity and favorable high-speed rotation performance, as well as being able to be used under severe lubrication conditions were frequently used in the past for the connecting rods of engines equipped on motorcycles and so forth.

FIGS. 8 through 12 show an example of a roller and cage assembly of the prior art. Furthermore, this roller and cage assembly is disclosed in Japanese Patent Laid-Open Publication No. 5-118337.

As shown in FIGS. 8 through 10, this roller and cage assembly is composed of a roughly cylindrically shaped cage 101, in which a plurality of pockets 101a are formed at equal intervals in the circumferential direction and formed in parallel in the axial direction, and rollers 102 (see FIG. 9), which have a larger diameter than the wall thickness of said cage 101 and are inserted into each of said pockets 101a. Said cage 101 has two rings 101b on both ends, and a plurality of columns 101c, which are integrated into a single structure with both said rings 101b and are arranged in the circumferential direction so as to demarcate the above-mentioned pockets 101a together with said rings 101b.

The end surfaces of both sides in the circumferential direction of each of said columns 101c serve as smooth roller guide surfaces 101d. In addition, inner retaining projections 101f and outer retaining projections 101g are respectively formed on both sides in the circumferential direction near the center and both ends in the axial direction of each of said columns 101c so as to face each pocket 101a. Rollers 102 are prevented from falling out to the inside and outside from said pockets 101a by these projections. As a result of employing this constitution, cage 101 and each roller 102 are integrated into a single structure, thereby making handling easy during attachment or removal of said roller and cage assembly to and from the engine and so forth.

The above-mentioned inner retaining projections 101f and outer retaining projections 101g are formed in the following manner.

Namely, a knurling shaft (not shown) is brought from inside and outside in contact with, pushed against with a prescribed pressure and rotated with respect to cage 101 in the form of a semi-finished product comprised by forming pockets 101a by punching a cylindrical material formed to have a cross-section roughly in the shape of the letter "M". As is clear from FIG. 10, according to this forming method, together with linear grooves 101h and 101i being formed on the inside and outside that cross columns 101c in the circumferential direction, buildups 101j and 101k are formed due to strain on the edges of said grooves 101h and 101i.

In the roller and cage assembly of this example, a design is employed wherein the outer circumference of cage 101 is guided by the inner surface (guide surface) of the attaching partner (e.g. the big end of a connecting rod). For this reason, since the guide surface of the attaching partner is damaged if the above-mentioned buildup 101k is present on the outside of columns 101c, the outside of cage 101 is ground (indicated with dimension $e_1$) as shown with the double-dotted broken line in FIGS. 11 and 12 to remove this buildup 101k. However, since it is not removed to the bottom of groove 101i and remains, grinding does not mainly extend to the above-mentioned outer retaining projection 101g formed farther to the inside from the bottom of said groove 101i.

Furthermore, since the inner circumference of cage 101 is not guided, buildup 101j formed on the inside of columns 101c is not removed. In addition, as is clear from FIG. 12, outer diameter $D_1$ of the material is set to be slightly larger (by the amount of the above-mentioned dimension $e_1$) than normal diameter $D_0$ so that cage 101 has said normal diameter $D_0$ after the above-mentioned outer grinding has been performed.

In the roller and cage assembly having the above-mentioned constitution, when in its operating state, roller 102 makes contact with roller guide surfaces 101d of columns 101c, are guided over nearly the pitch circle diameter (P.C.D.: see FIG. 12), and roll without making contact with inner retaining projection 101f and outer retaining projection 101g.

In the roller and cage assembly having the constitution described above, after a certain amount of operating time has elapsed, or when the amount of wear of roller guide surfaces 101d of columns 101c increases due to conditions of use and so forth, roller 102 shifts in the circumferential direction as a result of deviating from normal width W of pocket 101a as indicated with the broken line in FIG. 12 (the amount of this shift is indicated with reference numeral a in FIG. 12). Accordingly, there is the risk of said roller 102 making contact with outer retaining projections 101g as shown in FIG. 12. In said roller and cage assembly, this is based on the fact that the rising amount of roller 102 indicated with reference numeral $b_1$ in FIG. 12, namely the amount that roller 102 protrudes from the outer diameter of cage 101 when roller 102 moves to the outside in the radial direction and makes contact with outer retaining projections 101g, is inherently relatively small. Furthermore, in FIG. 12, reference numeral $c_1$ is the distance between contact points 103 of roller 102 (see FIG. 12) with respect to each outer retaining projection 101g formed on both sides in the circumferential direction of pocket 101a. In addition, reference numeral $d_1$ indicates the distance between both of said corresponding outer retaining projections 101g.

When roller 102 makes contact with outer retaining projections 101g in the manner described above, the amount of heat generated due to this contact is added, thus resulting in the problem of the occurrence of seizure in a relatively short time.

On the other hand, in said roller and cage assembly, since grooves 101i, which are formed during providing of the above-mentioned outer retaining projections 101g, remain, the contact surface area between the outer surface of cage 101 and the inner surface (guide surface) of the attaching partner is reduced by the amount of these grooves 101i, thus resulting in increased pressure of the contact surfaces and promotion of heat generation. In addition, there is also the problem of acceleration of the progress of wear of said contact surfaces.

In consideration of the above-mentioned problems of the prior art, the object of the present invention is to provide a roller and cage assembly that inhibits generation of heat and in turn, prevents the occurrence of seizure, thereby attaining a long service life while also offering various other advantages.

DISCLOSURE OF THE INVENTION

In order to achieve the above-mentioned object, the present invention comprises a roughly cylindrical cage, having rings on both ends and a plurality of columns arranged in the circumferential direction integrated into a single structure with each of said rings which demarcate pockets parallel in the axial direction together with said rings; and, rollers having a diameter larger than the wall thickness of said cage which are inserted into each of said pockets; wherein, in a roller and cage assembly composed by forming outer retaining projections that prevent said rollers from falling to the outside by protruding so as to face said pockets by machining a portion of said columns, the outside of said cage is cut away to remove all indentations formed by said machining so that the outer surfaces of said outer retaining projections coincide with the normal outer diameter.

According to the above-mentioned constitution, since the above-mentioned outer retaining projections are located in extremely close proximity to the outer diameter of the cage, together with maximizing the rising amount of the rollers, since indentations in the circumferential portions of the cage corresponding to said outer retaining projections do not remain, the contact pressure with the guide surface of the attaching partner is reduced.

BEST MODE FOR CARRYING OUT THE PRESENT INVENTION

Figure 1:
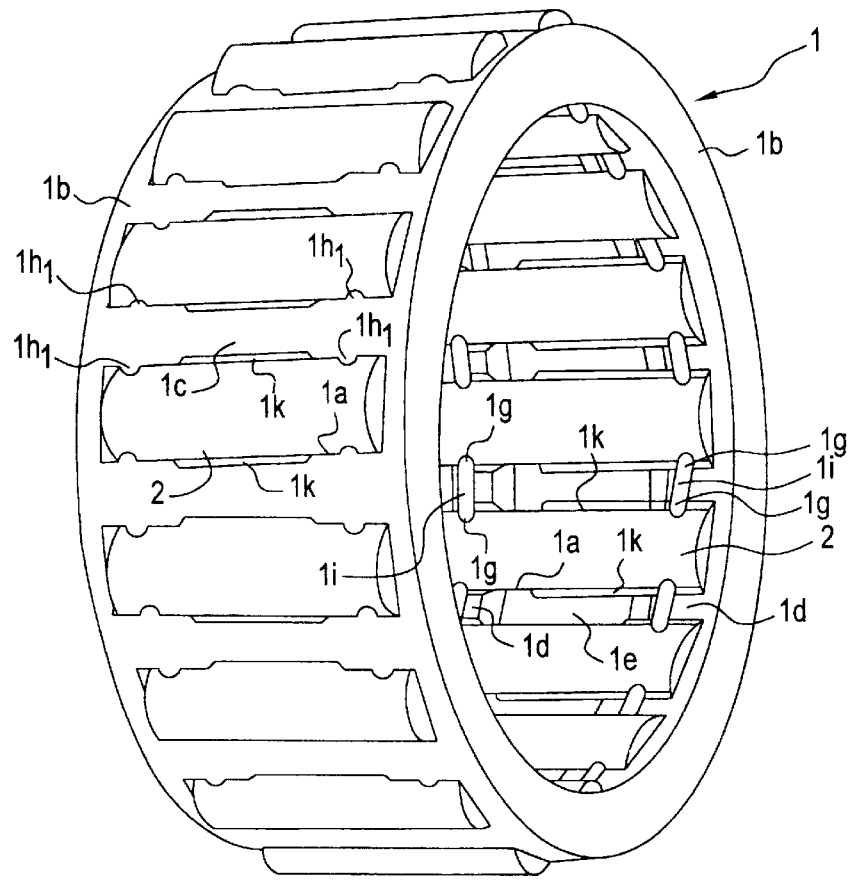
FIG. 1 is a perspective view of a roller and cage assembly as a first embodiment of the present invention.
Figure 2:
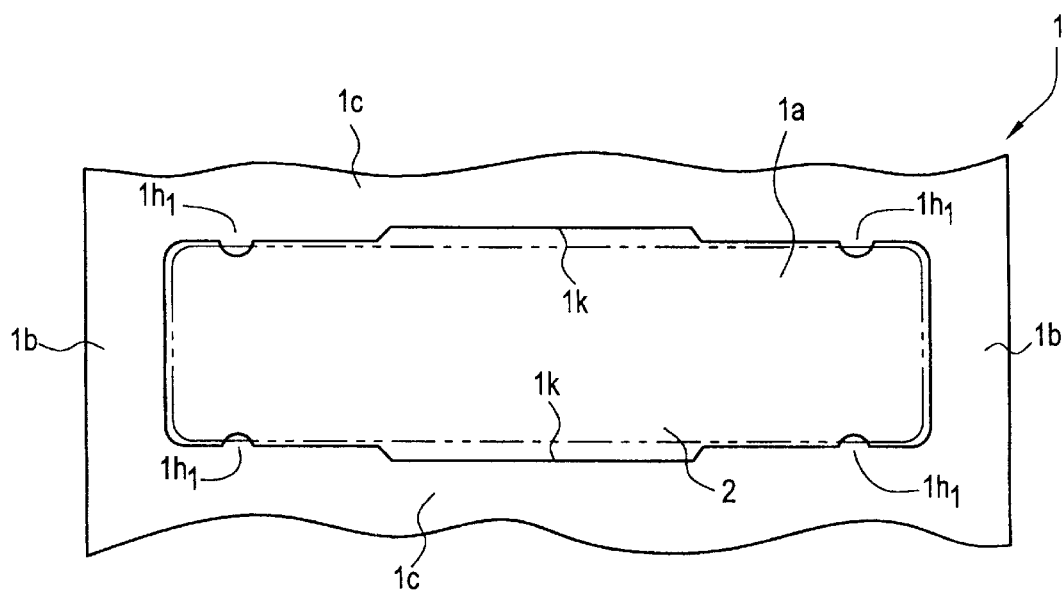
FIG. 2 is an enlarged view of a portion of the roller and cage assembly shown in FIG. 1.

The following provides an explanation of a roller and cage assembly as an embodiment of the present invention with reference to the attached drawings.

As shown in FIGS. 1 through 4, the roller and cage assembly as claimed in the present invention is composed of cage 1, roughly in the shape of a cylinder, in which a plurality of pockets 1a are formed in parallel with the axial direction and at equal intervals in the circumferential direction, and needle-shaped rollers 2 inserted into each of said pockets 1a. Furthermore, the width dimension of each of said pocket 1a is set to be slightly larger than the outer diameter dimension of rollers 2 excluding the dimension between each of the retaining projections to be described later. In addition, the diameter of each roller 2 is larger than the thickness of cage 1.

Cage 1 is formed into a single structure with two rings 1b on both ends, and a plurality of columns 1c, which mutually join both said rings 1b and are arranged in the circumferential direction so as to demarcate each of said pockets 1a together with each of said rings 1b.

Figure 3:
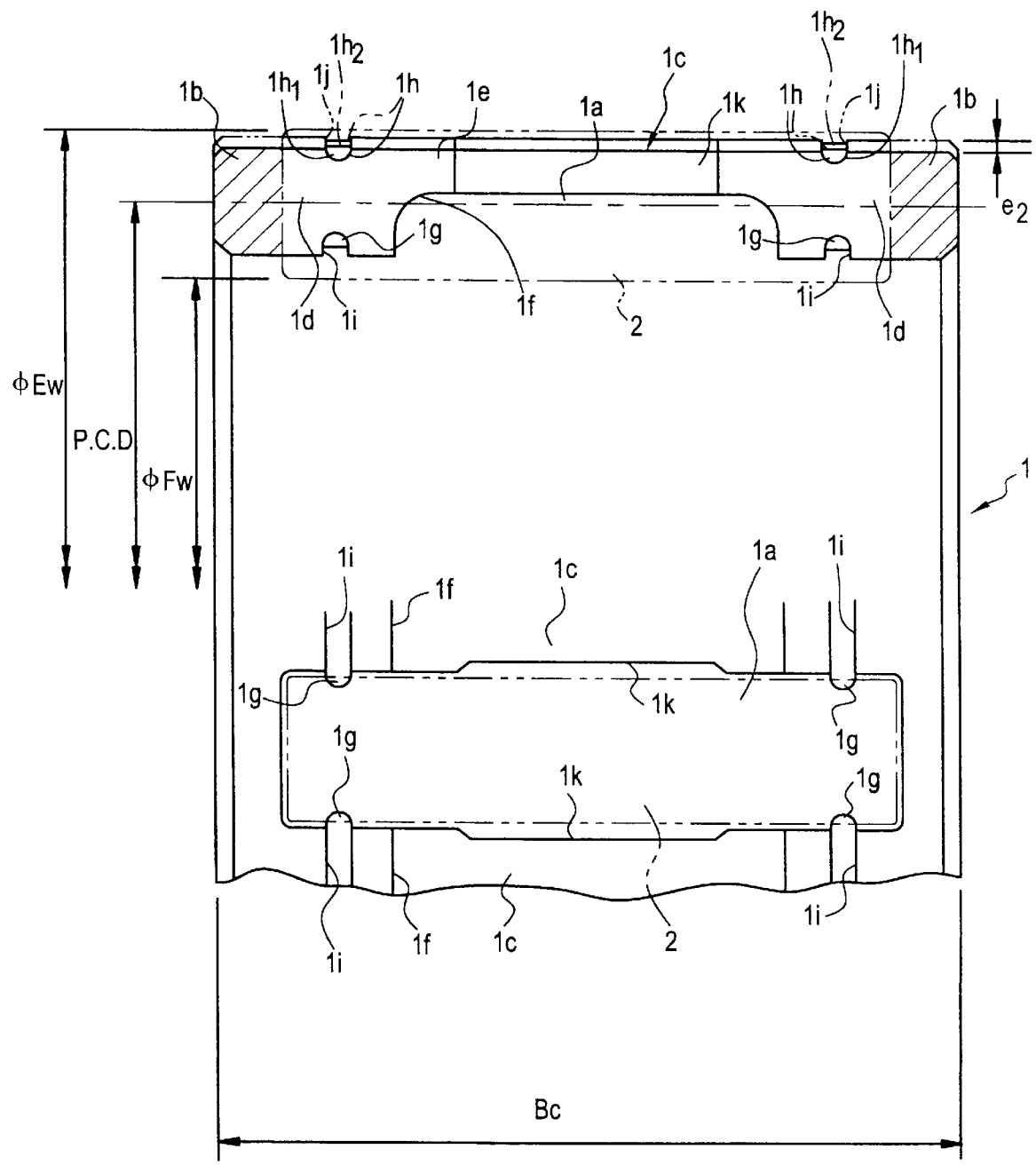
FIG. 3 is a longitudinal cross-sectional view parallel to the axial direction of a portion of the roller and cage assembly shown in FIG. 1.

As is clear from FIG. 3, each column 1c is formed so that its outside surface lies in the same plane as the outside surfaces of both rings 1b roughly over its entire length. According to this constitution, the outer surface of cage 1 is a perfectly cylindrical surface with the exception of the pocket portions, the contact surface area with the inside surface (guide surface) of an attaching partner in the form of the big end of a connecting rod (described later) is extremely large, and the pressure of the contact surface is reduced considerably, thus being particularly effective in inhibiting generation of heat and wear of said contact surface.

As is also clear from FIG. 3, roughly U-shaped indentation 1f is formed in column 1c in its inside and in the center of the axial direction that extends farther to the outside than the pitch circle diameter (P.C.D.) of roller 2 and is shorter than the length of pocket 1a. Consequently, column 1c has thick-walled portions 1d on both ends that are respectively continuous with rings 1b, and thin-walled portion 1e in the center juxtapositioned between both said thick-walled portions 1d. Both side surfaces in the circumferential direction of these thick-walled portions 1d serve as smooth roller guide surfaces, and smoothly guide rollers 2 while making sliding contact on said roller guide surfaces.

According to the above-mentioned constitution in which roughly U-shaped indentation 1f is formed, together with the constitution in which the outer surface of column 1c and the outer surfaces of rings 1b lie in the same plane as described above, column 1c exhibits the shape of a gate together with the cross-sectional shape of both rings 1b. Since cage 1 has a cross-sectional shape in the shape of a gate in this manner, a relatively large section modulus is secured, thus obtaining light weight and high rigidity.

Figure 9:
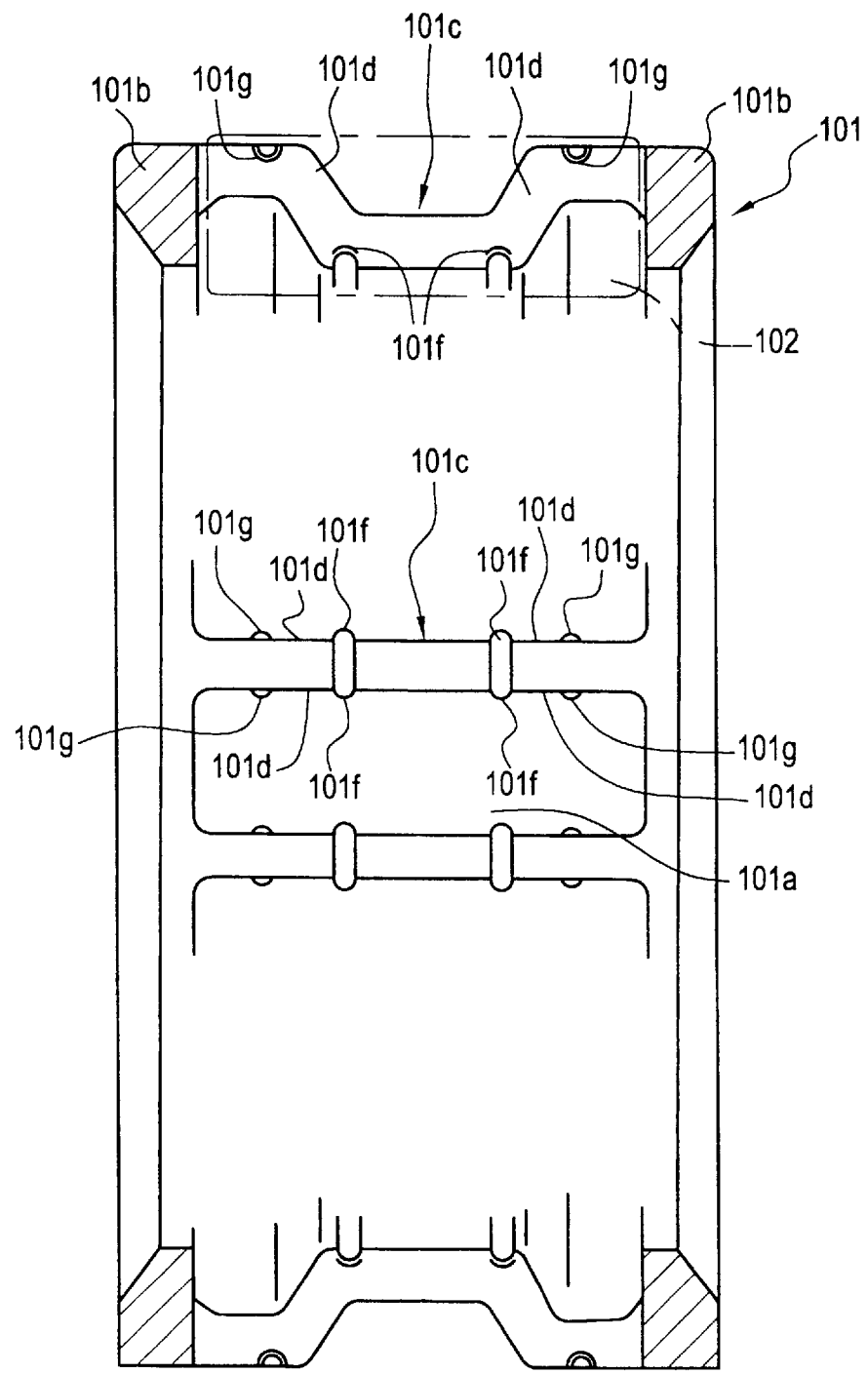
FIG. 9 is a longitudinal cross-section parallel to the axial direction of the roller and cage assembly shown in FIG. 8.
Figure 10:
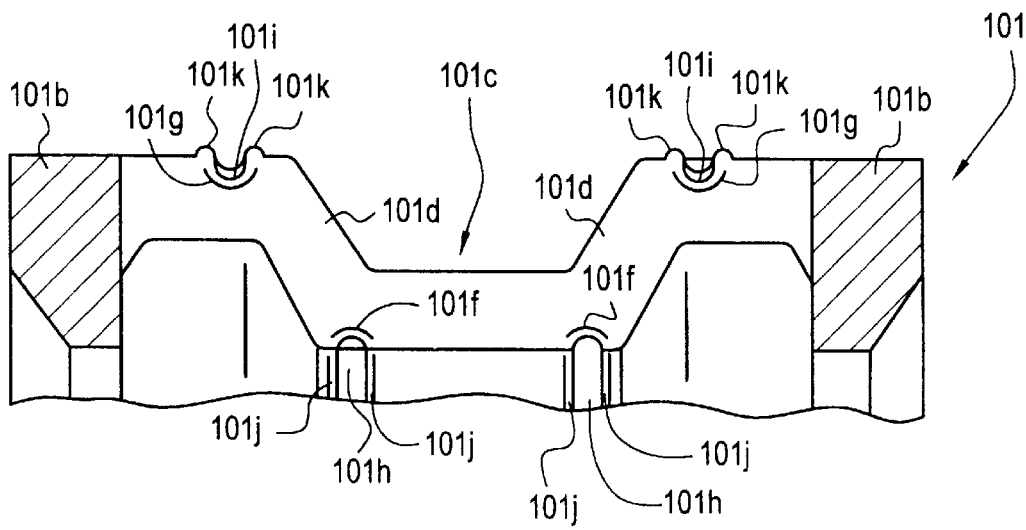
FIG. 10 is a longitudinal cross-sectional view parallel to the axial direction of a portion of the roller and cage assembly shown in FIG. 8.
Figure 11:
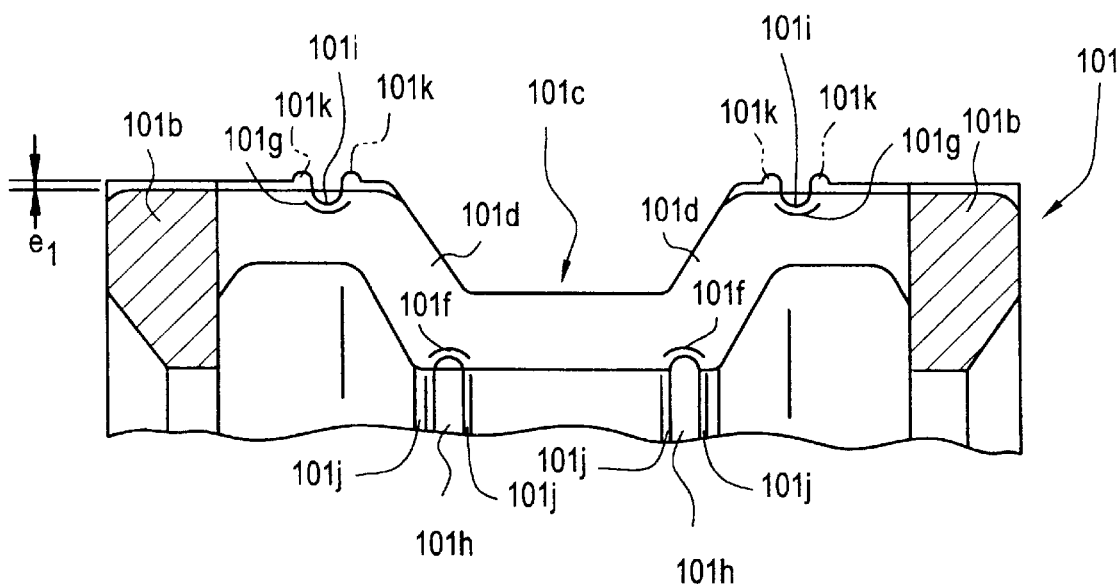
FIG. 11 is a longitudinal cross-sectional view parallel to the axial direction of a portion of the roller and cage assembly shown in FIG. 8.
Figure 12:
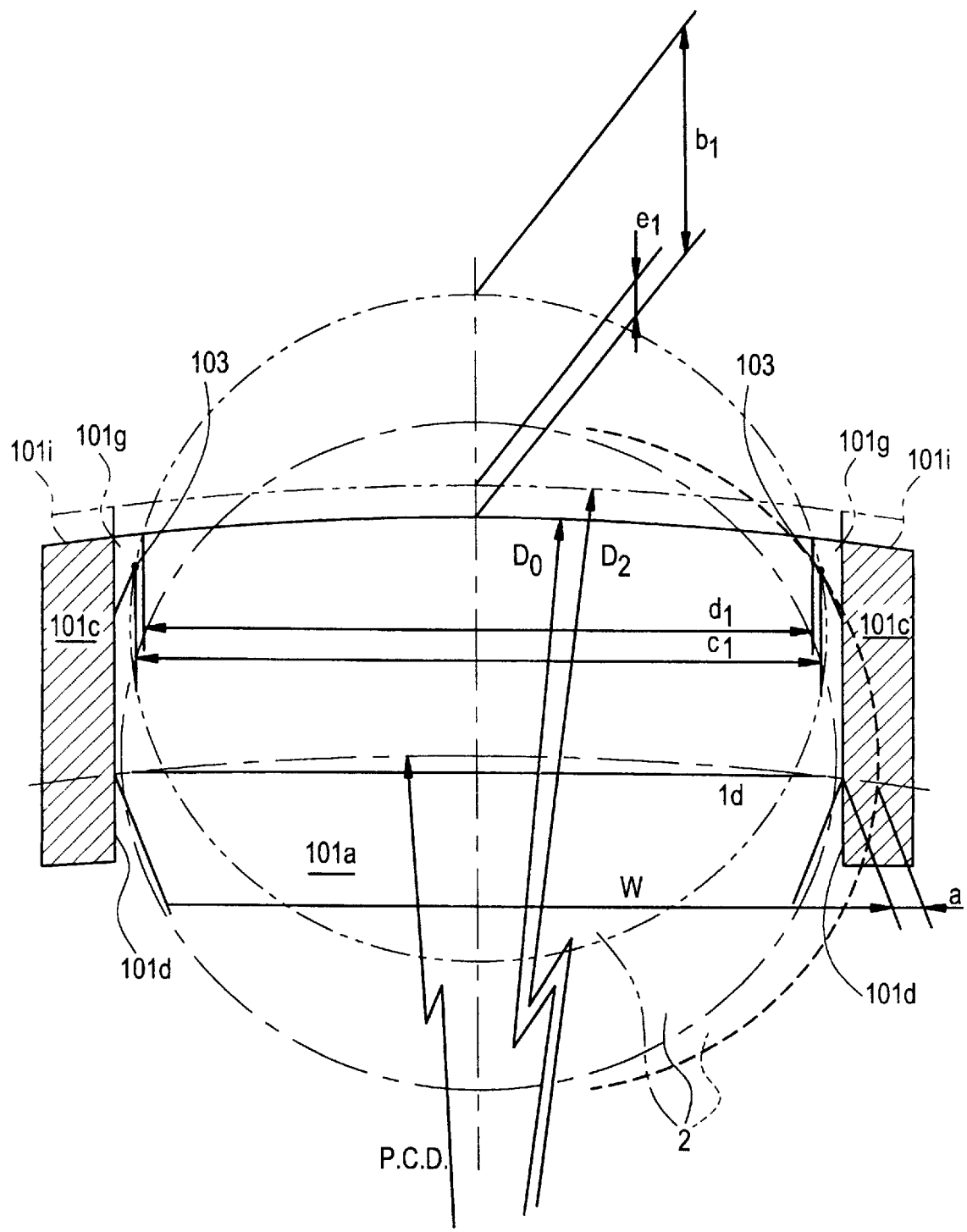
FIG. 12 is a longitudinal cross-sectional view perpendicular to the axial direction of an enlarged portion of the roller and cage assembly shown in FIG. 8.

Furthermore, in the above-mentioned constitution having a gate-shaped cross-section, since roller 2 is guided by thick-walled portions 1d on both ends of column 1c, the tilting or skew of roller 2 is held to a low level, thus reducing sliding with the track surface resulting in reduced generation of heat. In addition, in this gate-shaped cross-section, since the width dimension of column 1c along the pitch circle diameter (P.C.D.) of roller 2 is relatively small, the number of rollers 2 that can be incorporated can be increased, which in consideration of the high rigidity as previously described, is preferable at times when a high load capacity is required. Incidentally, as is particularly clear from FIG. 9, in the roller and cage assembly shown as an example of the prior art in FIGS. 8 through 12, the central portion of column 101c is bent towards the inside diameter so as to form the letter "M" with the cross-sectional shape of rings 101b on both ends, and for this reason is referred to as an M-shaped roller and cage assembly. In this M-shaped roller and cage assembly, in the case of setting the width dimension of columns 101c along the pitch circle diameter of the rollers to be the same as that of the gate-shaped roller and cage assembly as claimed in the present invention, the number of rollers that can be incorporated is less than that of the present invention. In addition, since columns 101c themselves are thin-walled and bent considerably, rigidity is inhibited, thus making them frequently selected in cases of receiving relatively light loads.

Figure 4:
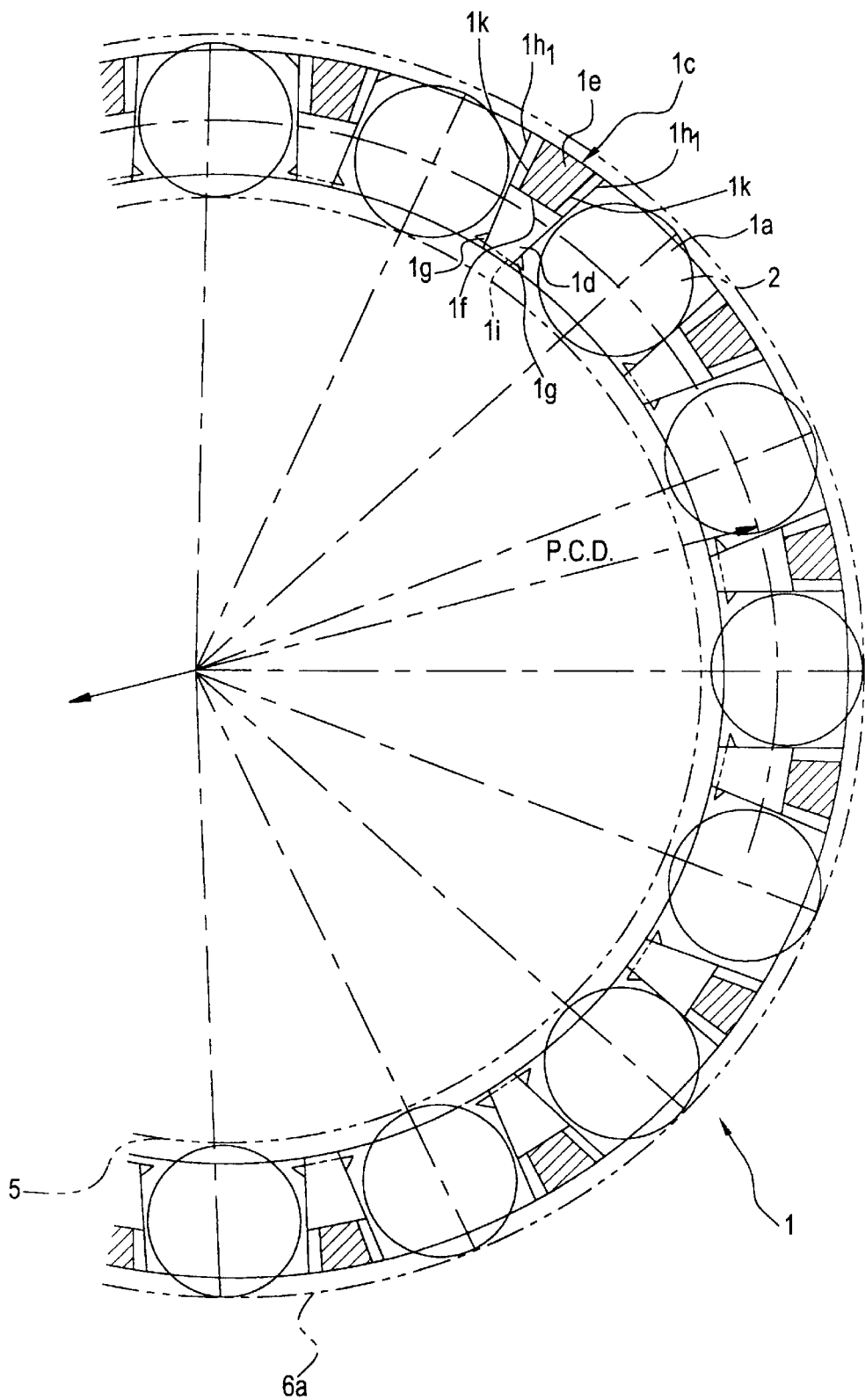
FIG. 4 is a longitudinal cross-sectional view perpendicular to the axial direction of a portion of the roller and cage assembly shown in FIG. 1.
Figure 5:
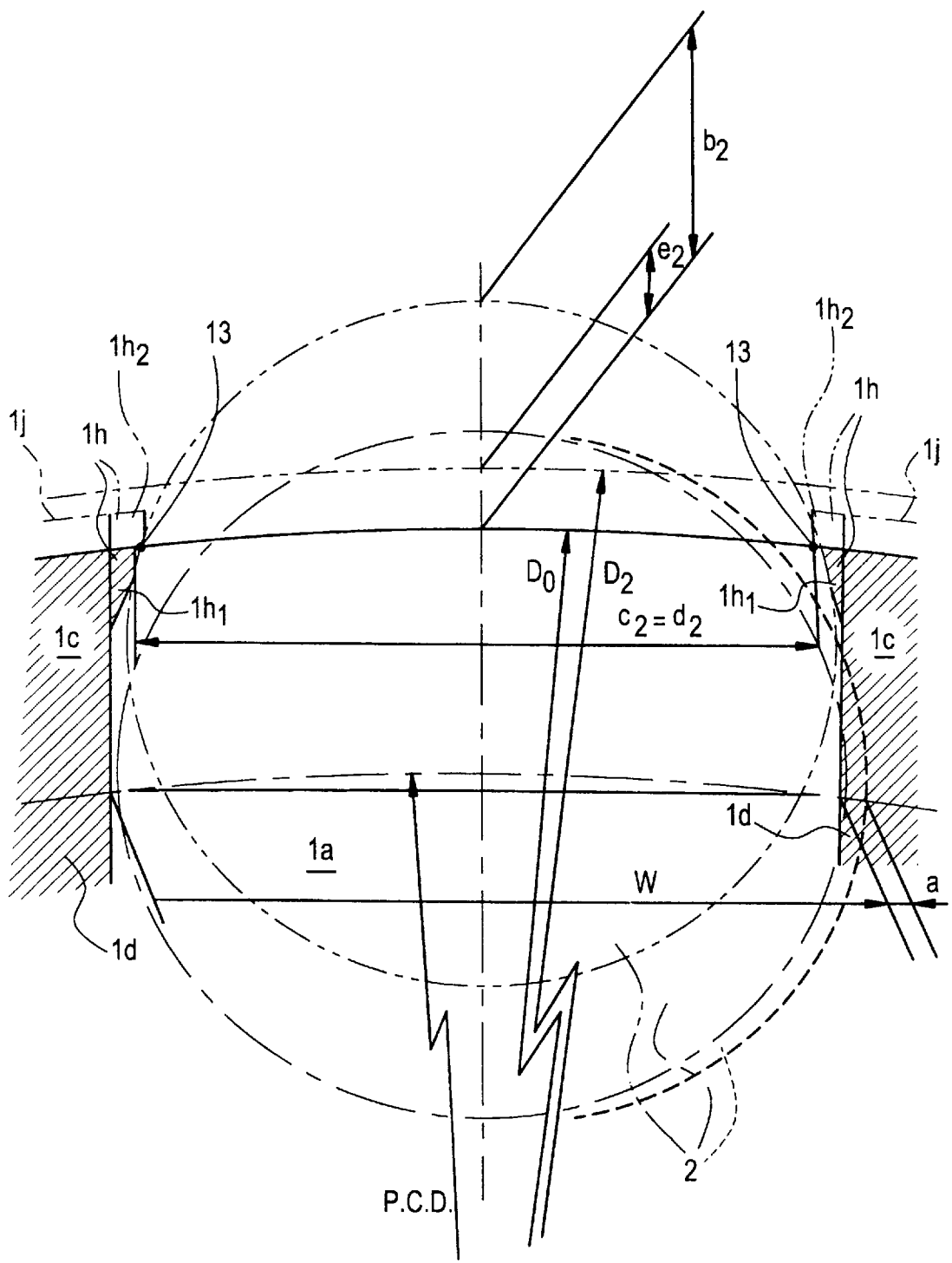
FIG. 5 is a longitudinal cross-sectional view perpendicular to the axial direction of an enlarged portion of the roller and cage assembly shown in FIG. 1.

As shown in FIGS. 3 and 4, a pair of inner retaining projections 1g are formed in the vicinity of both ends of the above-mentioned column 1c, namely on both inside surfaces of both thick-walled portions 1d. In addition, a pair of outer retaining projections $1h_1$ are formed in the same manner on the outside at locations corresponding said inner retaining projections 1g. However, only outer retaining projections $1h_1$ are shown in FIG. 5. These inner retaining projections 1g and outer retaining projections $1h_1$ protrude so as to face pocket 1a, and the distance between said retaining projections of adjacent columns 1c in the circumferential direction is set to be slightly smaller than the diameter of rollers 2. Rollers 2 are retained by these projections, and prevented from falling out to the inside and outside from pockets 1a.

As shown in FIGS. 1 through 4, notches 1k of a prescribed length are formed in each column 1c in the center in its axial direction so as to enlarge a portion of pocket 1a on both sides in the circumferential direction. As a result of enlarging a portion of pocket 1a in this manner, the ability of said roller and cage assembly to incorporate lubricant (oil) is improved. In particular, as a result of forming notches 1k in the center in the axial direction of cage 1 in this manner, lubrication is excellent in the case of attaching said roller and cage assembly onto big end 6a of connecting rod 6 as shown in FIG. 6.

Figure 6A:
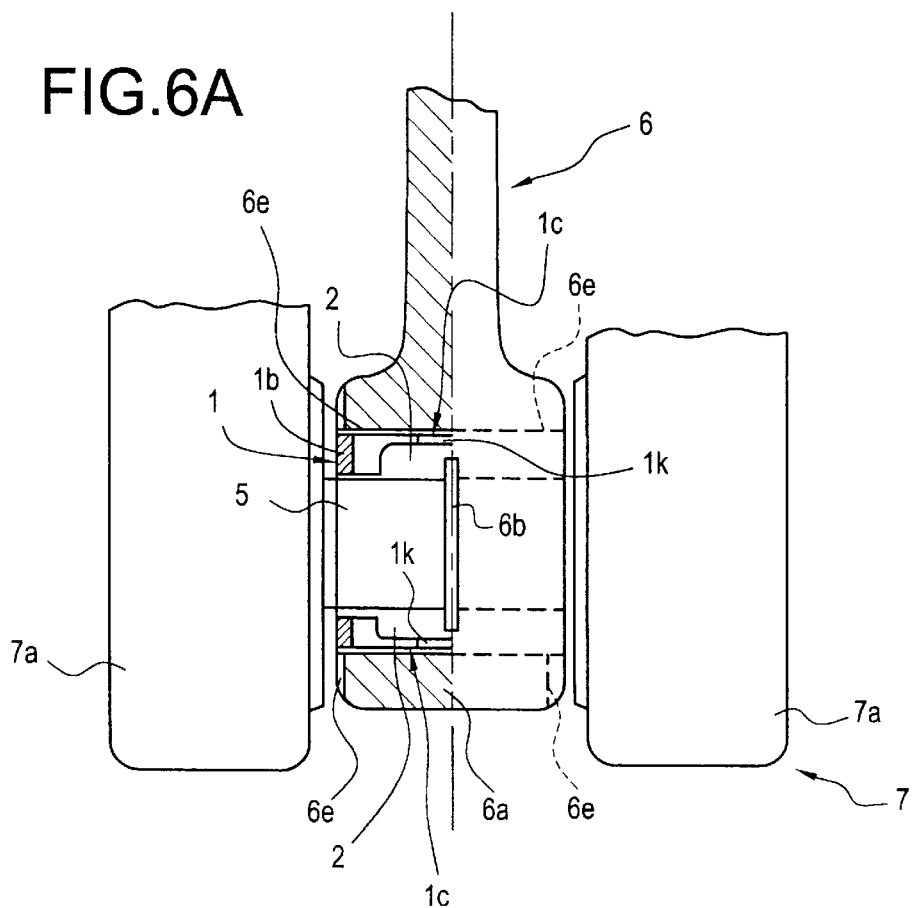
FIG. 6(a)–(b) are drawings showing the roller and cage assembly shown in FIG. 1 attached to the connecting rod of an engine.
Figure 6B:
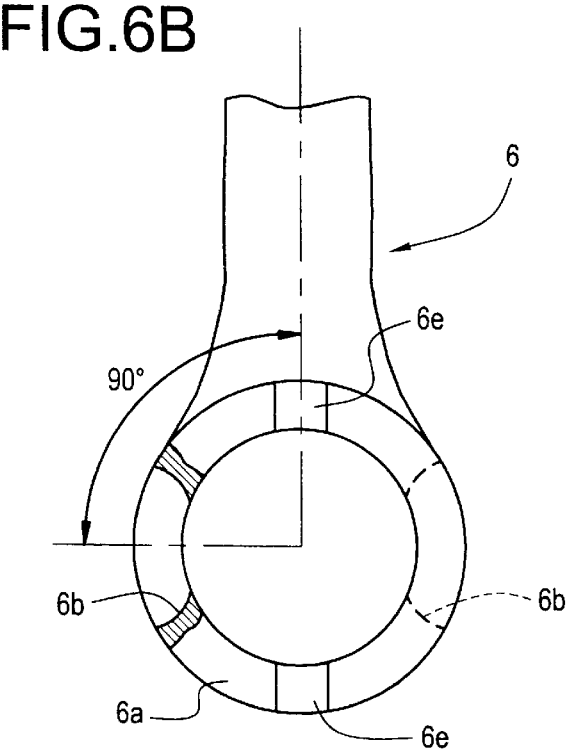

Namely, in the attached state shown in FIG. 6(a), the supply of lubricant to said roller and cage assembly performed through side slit 6e (see also FIG. 6(b)) formed in the end in the axial direction of big end 6a in opposition to weight 7a of crankshaft 7, and center slit 6b (see also FIG. 6(b)) formed in the center in the axial direction of big end 6a. The amount of lubricant supplied from center slit 6b of big end 6a is expected to be relatively large. Since the above-mentioned notches 1k, which are enlarged portions of pocket 1a, are located corresponding to center slit 6b for supply of lubricant formed in the center in the axial direction of big end 6a in this manner, lubricant flows in efficiently, thus resulting in excellent lubrication and seizure resistance.

Furthermore, reference numeral 5 in FIG. 6 indicates a crank pin. In addition, said crank pin 5 and the above-mentioned big end 6a are also shown in FIG. 4.

The roller and cage assembly having the above-mentioned constitution is manufactured in the following manner. Furthermore, a material such as cemented steel (SCM415, STKM13) is selected for the material of cage 1, while ball-bearing steel (SUJ2) and so forth is used for rollers 2.

With respect to cage 1, a cylindrical material is first prepared by cutting a long pipe material made of the above-mentioned material to the prescribed length. Next, pockets 1a are formed by performing punching on the cylindrical material, the cross-section of which has been lathed into the shape of a gate. Moreover, inner retaining projections 1g and original outer retaining projections 1h are formed by placing a knurling shaft (not shown) against the inside and outside, pushing it against the inside and outside at a prescribed pressure and rotating. As a result of performing this knurling, linear grooves 1i and 1j are formed in the inside and outside in the form of indentations that cross columns 1c in the circumferencial direction as shown in FIGS. 3 and 5. This is then followed by heat treatment.

Continuing, the outside of cage 1 ground (by an amount indicated with reference numeral $e_2$) as shown with the double-dotted broken line in FIGS. 3 and 5 to remove all of the above-mentioned grooves 1j that were formed as a result of knurling. As is clear from FIG. 5, the outer diameter $D_2$ of the material before grinding is set in advance to a value obtained by adding the amount of grinding $e_2$ to the normal diameter $D_0$ so that the diameter of cage 1 becomes said normal diameter $D_0$ after outer grinding has been completed. In addition, a shown in FIGS. 3 and 5, as a result of performing this grinding, outer portion $1h_2$ is cut away from original outer retaining projection 1h formed by knurling as described above, and the remaining portion becomes the normal outer retaining projection $1h_1$ previously described. Thus, the outer surface of this normal outer retaining projection $1h_1$ and normal diameter $D_0$ of cage 1 coincide.

Furthermore, in the present embodiment, outer portion $1h_2$ of original outer retaining projection 1h is cut away by grinding performed to remove the above-mentioned groove 1j formed in the outside of the cage by knurling. This may be performed in the following manner.

Namely, in FIG. 5, the outer diameter of the material is set so that the bottom surface of groove 1j, namely the outer surface of original outer retaining projection 1h, coincides with normal diameter $D_0$ of cage 1 in its original form, and grinding is completed once grinding reaches the bottom surface of said groove 1j. According to this constitution, original outer retaining projection 1h formed by knurling becomes the normal outer retaining projection without modification. In other words, the above-mentioned groove 1j can be removed without leaving any portion behind.

Once forming of cage 1 has been completed as described above, the outer surface of said cage 1 is copper and/or silver plated. As a result, the conformability of the outer diameter surface of the care to the guide surface is improved.

On the other hand, although not described in detail, a needle-shaped material is prepared for rollers 2 by cutting a linear material made of the material described above to the prescribed length, and then performing grinding and heat treatment and so forth on this material. Rollers 2 obtained in this manner are then inserted by press-fitting into pockets 1a of cage 1 to complete said roller and cage assembly.

FIGS. 4 and 6 show the state of use in which the roller and cage assembly having the above-mentioned constitution is juxtapositioned between big end 6a of connecting rod and crank pin 5. In this usage state, rollers 2 smoothly make contact with roller guide surfaces formed on thick-walled portions 1d (see also FIG. 3 and so forth) of columns 1c, are guided over nearly the pitch circle diameter (P.C.D.), and rotate without making contact with inner retaining projections 1g and outer retaining projections $1h_1$. In addition, dimensions are set so that the outer surface of cage 1 makes contact with the inner surface (guide surface) of big end 6a before the circumferential surface of cage 1 makes contact with crank pin 5. Namely, a design is employed wherein the outside of cage 1 is guided by the inner surface (guide surface) of big end 6a of connecting rod in said roller and cage assembly. Thus, in said roller and cage assembly, since the inner surface of cage 1 is not guided, and rollers 2 do not make contact with inner retaining projections 1g as a result of being swung around by centrifugal force during rotation of said roller and cage assembly, grinding is not performed on inner retaining projections $1g$ and grooves $1i$ formed in the inside of the cage.

As has been described above, in said roller and cage assembly, the outside of cage 1 is ground to completely remove indentations in the form of groove $1j$ formed during machining of outer retaining projections, and the outer surfaces of said outer retaining projections are made to coincide with normal diameter $D_0$ (see FIG. 5) of cage 1.

According to this constitution, as is particularly clear from FIG. 5, outer retaining projections $1h_1$ can be located in extremely close proximity to the outer surface of cage 1, and the amount of protrusion $b_2$ of rollers 2 from cage 1 towards the outside in the radial direction, namely the rising amount, can be increased. In other words, contact points 13 of rollers 2, at which contact is made with each outer retaining projection $1h_1$ formed in both sides in the circumferential direction of pockets $1a$ (see FIG. 5), rises to the outside of the cage. Furthermore, as shown in FIG. 5, distance $c_2$ between said contact points 13 nearly coincides with distance $d_2$ between said corresponding outer retaining projections $1h_1$.

The following advantages are obtained as a result of employing the above-mentioned constitution.

Namely, in the roller and cage assembly of the above-mentioned constitution, after a certain amount of operating time elapses, or when the amount of wear of the roller guide surface of columns $1c$ increase due to conditions of use, roller 2 deviates from normal width W of pocket $1a$ as indicated with the broken Line in FIG. 5, and shifts in the circumferential direction the amount of shift is indicated with reference numeral a in FIG. 5). Accordingly, roller 2 approaches outer retaining projection $1h_1$.

In the roller and cage assembly as claimed in the present invention, since outer retaining projections $1h_1$ are located in extremely close proximity to the outer surface of cage 1 as previously described, even if the roller guide surface of columns $1c$ of cage 1 becomes worn in this manner, either roller 2 does not make contact with said outer retaining projection $1h_1$ or the amount of time until it does make contact, namely the amount of time until the occurrence of heat generation and seizure, is prolonged, thereby extending service life.

In addition, since the above-mentioned groove $1j$ that is formed to provide outer retaining projection $1h_1$ is completely removed, the contact surface area between the outer surface of cage 1 and the inner surface (guide surface) of the attaching partner in the form of big end $6a$ of connecting rod increases, thereby reducing the pressure of the contact surface and inhibiting generation of heat and wearing of said contact surface.

Moreover, according to the above-mentioned constitution, since machining of pocket $1a$, outer retaining projection $1h_1$ and inner retaining projection $1g$ is performed on the state of having an amount of grinding ($e_2$) greater than or equal to the depth of the above-mentioned groove $1j$ in addition to the above-mentioned normal outer diameter $D_0$, namely on a thick-walled and highly rigid cylindrical material, the strain resulting from that machining is held to a low level, thereby improving the dimensional accuracy of pocket $1a$, outer retaining projection $1h_1$ and inner retaining projection $1g$.

In addition, the above-mentioned outer retaining projection $1h_1$ and inner retaining projection $1g$ are formed in thick-walled portions $1d$ on both ends of column $1c$ which have relatively high rigidity. Thus, the amount of deformation of cage 1 based on pressure applied by knurling is held to a low level, thereby enabling the dimensions of pocket $1a$ to maintain high accuracy.

Here, with respect to the roller and cage assembly of the present embodiment, the results are shown of actually fabricating a prototype an(i measuring the above-mentioned rising amount $b_2$ of rollers 2 (see FIG. 5) along with the outer surface area of cage 1, namely the contact surface area during contact with a big end of connecting rod. In addition, a separate prototype was also fabricated in which grinding was not performed on outer surface of the cage in order to compare with the value of the roller and cage assembly as claimed in the present invention. Since the rising amount and outer surface area of the cage were also measured for that prototype, those results are also shown. It goes without saying, however, that the outer diameter of the cylindrical material prior to knurling of the separate prototype used for comparison was already made to be normal diameter $D_0$.

Each of the major dimensions shown in FIG. 3 for both of said prototypes were set as shown below. In addition, the number of rollers was set at 16.

$F_W$: Roller set bore diameter=22 mm
$E_W$: Roller set outside diameter=29 mm
$B_C$: Cage width=17 mm
Roller diameter=3.5 mm
Roller length=13.8 mm As a result of setting to the above-mentioned dimensions, a value of approximately 0.7 to 1.0 mm was obtained for the rising amount $b_2$ in the prototype as claimed in the present invention, while that in the prototype on which grinding was not performed was approximately 0.4 to 0.7 mm. Namely, in the prototype as claimed in the present invention, rising amount $b_2$ was able to be increased by approximately 0.3 mm on average in comparison with the prototype in which grinding was not performed.

For example, when using for the connecting rod of an engine equipped on a straddled seat type of motor vehicle (such as a motorcycle), roller and cage assembly are typically selected in which the roller diameter is approximately 3 to 4 mm, which corresponds to that in the above-mentioned prototype. When this prototype was actually installed on said engine and the same experiment was performed, it was verified that the required effects were obtained if the minimum value of the above-mentioned rising amount $b_2$ is taken to be approximately 0.7 mm as mentioned above.

On the other hand, in contrast to the outer surface area, namely the contact surface area, being 575 mm$^2$ in the non-grinding prototype, that in the prototype as claimed in the present invention is 641 mm$^2$, thus enabling it to be increased by 11.5%. Thus, it was verified that the prototype as claimed in the present invention reduces the pressure of outer diameter contact surface of cage during rotation by 10.3% in comparison with the non-grinding prototype.

Figure 7:
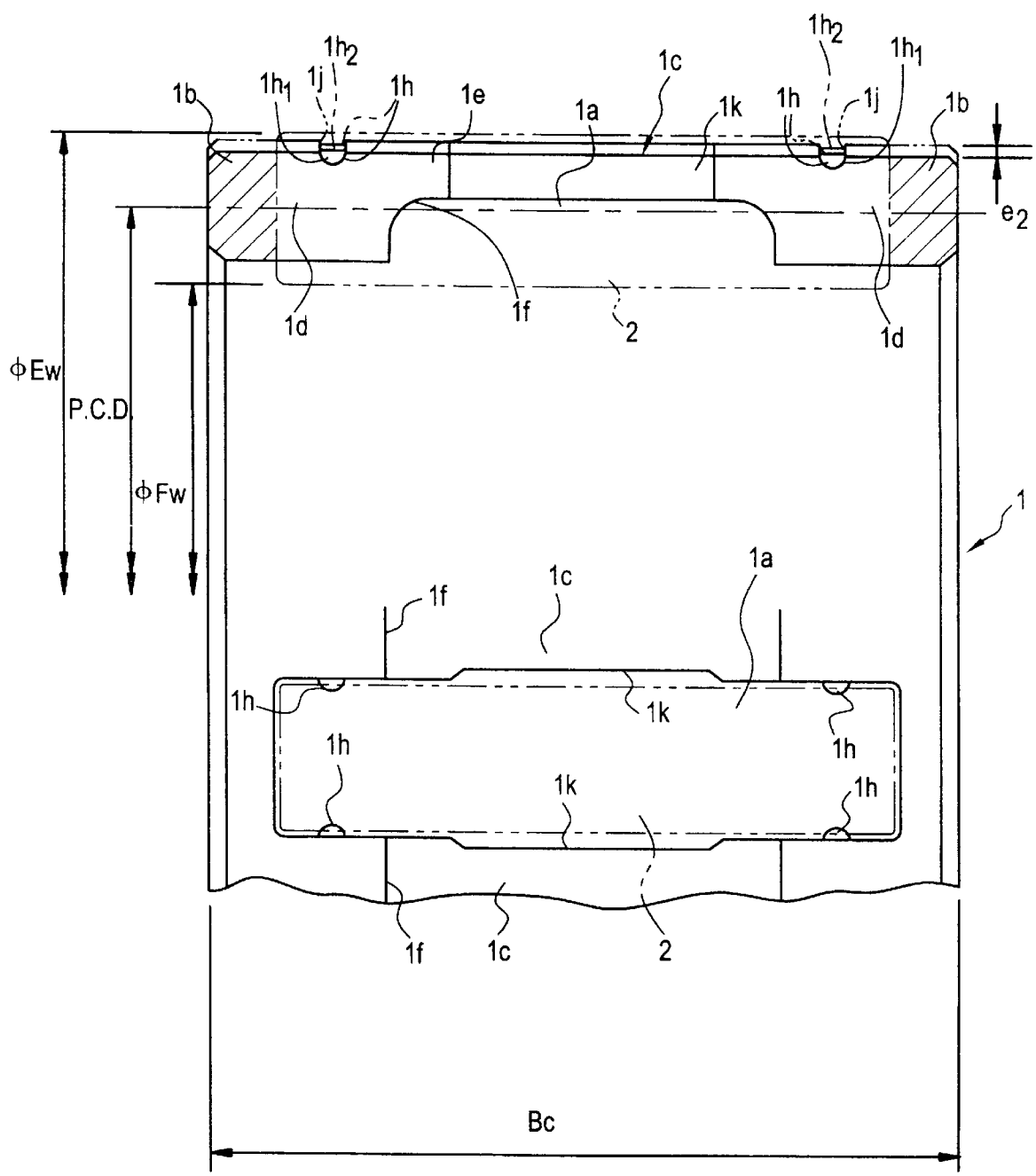
FIG. 7 is a longitudinal cross-sectional view parallel to the axial direction of a portion of a roller and cage assembly as a second embodiment of the present invention.
Figure 8:
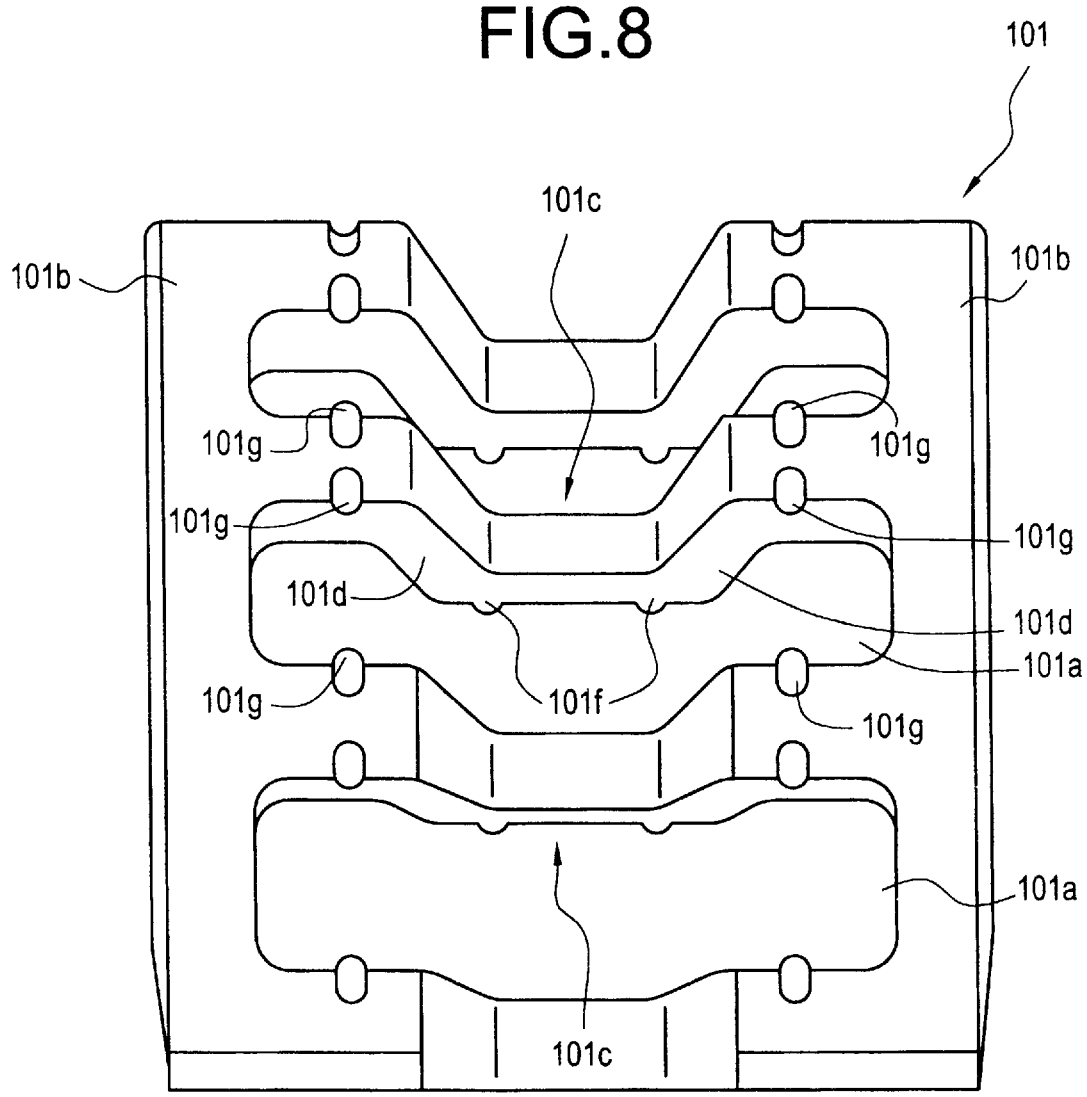
FIG. 8 is a front view of a portion of a roller and cage assembly of the prior art.

FIG. 7 shows a longitudinal cross-section of the essential portion of a roller and cage assembly as a second embodiment of the present invention. Furthermore, since this second embodiment of a roller and cage assembly is composed in the same manner as the first embodiment of a roller and cage assembly shown in FIGS. 1 through 6 with the exception of those portions explained below, an overall explanation will be omitted. Instead, the explanation will only focus on the essential portion. In addition, in the following explanation, the same reference numerals will be indicated for those constituents that are identical or correspond to the constituents of the roller and cage assembly of said first embodiment.

As shown in the drawings, in said roller and cage assembly, the thickness of cage 1 is less than the thickness of the cage of the roller end cage assembly of the above-mentioned first embodiment. Inner retaining projections are not formed, while only outer retaining projections $1h_1$ are formed. The forming method of these outer retaining projections $1h_1$ is the same as that of the first embodiment. Thus, even if rollers 2 are prevented from falling out on the outside only, this roller and cage assembly still demonstrates the required effects in the same manner as above-mentioned roller and cage assembly of the first embodiment.

Furthermore, in a roller and cage assembly in which rollers 2 are prevented from falling out on both the inside and outside as in that of the above-mentioned first embodiment, rollers 2 are integrated into a single structure with cage 1, thereby facilitating easy handling during attaching to a connecting rod and so forth.

Furthermore, in each of the above-mentioned embodiments, the case is shown in which outer retaining projections $1h_1$ of cage 1 (and inner retaining projections in the first embodiment) are formed by caulking as a result of performing knurling after which groove $1j$ ($1i$) formed by said caulking is removed. Alternatively however, this may also be performed by first forming said projections by molding and then grinding the outer diameter surface until the depressions formed as a result of that molding are completely removed.

In addition, although the roller and cage assemblies of each of the above-mentioned embodiments have a gate-shaped cross-section, the present invention can naturally also be applied to those having an M shape as well as various other types of roller and cage assemblies.

In addition, although grinding is performed in each of the above-mentioned embodiments to remove grooves formed as a result of knurling, this may also be performed by cutting in the broad sense of the word.

Moreover, although the entirety of cage 1 is formed as a single structure in the form of a cylinder in each of the above-mentioned embodiments, a split structure may also be employed, namely a constitution may be employed wherein two halves of a pair of half-circular portions are mutually joined. There are two types of the crankshaft 7 shown in FIG. 6, one in which crank pin 5 and weight 7a are separate and one in which they are integrated into a single structure. Although a completely cylindrical, integrally molded cage can be incorporated in the separate type of crankshaft, it cannot be incorporated in an integrated type of crankshaft. If a cage is used that employs a split structure, it can be incorporated in either a separate type of crankshaft or integrated type of crankshaft.

INDUSTRIAL APPLICABILITY

As has been explained above, in the roller and cage assembly according to the present invention, the outside of the cage is ground to completely remove depressions formed during machining of outer retaining projections so that the outer surface of said outer retaining projections coincides with the normal outer diameter of the cage.

According to said constitution, since these outer retaining projections are located in extremely close proximity to the outer surface of the cage, the amount of protrusion of the rollers to the outside in the radial direction with respect to the cage, namely the rising amount, can be increased. Thus, even if the roller guide surface of the columns of the cage becomes worn, either the rollers do not make contact with said outer retaining projections or the amount of time until they do make contact, namely the amount of time until the occurrence of heat generation and seizure, is prolonged, thereby extending service life.

In addition, since the above-mentioned depressions formed for providing outer retaining projections are completely removed, the contact surface area between outer surface of the the cage and the inner surface (guide surface) of the attaching partner (e.g. big end of connecting rod) is increased, thereby reducing the pressure of the contact surface resulting in inhibition of heat generation and wear of said contact surface.

Moreover, according to the above-mentioned constitution, since machining of the pockets and outer retaining projections (and similarly in the case of providing inner retaining projections) is performed on the state of having an amount of grinding greater than or equal to the depth of the above-mentioned depressions in addition to the above-mentioned normal outer diameter, namely on a thick-walled and highly rigid cylindrical material, the strain resulting from that machining is held to a low level, thereby improving the dimensional accuracy of the pockets and outer retaining projections (as well as inner retaining projections).

Continuing, in the roller and cage assembly according to the present invention, each of the columns of the cage is formed so that its outside surface lies in the same plane as the outside surfaces of rings roughly over its entire length. According to this constitution, the outer surface of the cage is a perfectly cylindrical surface with the exception of the pocket portions, the contact surface area with the above-mentioned attaching partner is extremely large, and the pressure of the contact surface is reduced considerably, thus being particularly effective in inhibiting generation of heat and wear as described above.

In addition, in the roller and cage assembly according to the present invention, notches are formed in each of the above-mentioned columns in the center in its axial direction and on both sides in the circumferential direction so as to enlarge a portion of the pockets. As a result of enlarging a portion of the pockets in this manner, the ability of said roller and cage assembly to incorporate lubricant is improved. In particular, in the case of attaching said roller and cage assembly onto the big end of a connecting rod, since enlarged pocket portions are located corresponding to slits for supplying lubricant formed in the center in the axial direction of said big end, lubricant is able to flow in efficiently, thereby resulting in favorable lubrication and seizure resistance.

Moreover, in the roller and cage assembly according to the present invention, as a result of enabling columns to have a thick-walled portions on both ends and a thin-walled portion in the center by forming roughly U-shaped indentations on the inside and in the center in the axial direction of the above-mentioned columns that extend farther to the outside than the pitch circle diameter of the rollers and are shorter than the length of the pockets, the above-mentioned outer retaining projections are formed in both of said thick-walled portions. According to the constitution in which these roughly U-shaped indentations are formed, together with the constitution in which the outer surface of the columns and the outer surfaces of rings lie in the same plane as described above, the columns exhibit the shape of a gate together with the cross-sectional shape of both rings. Since the cage has a cross-sectional shape in the shape of a gate in this manner, light weight and high rigidity are obtained. In addition, since outer retaining projections (and similarly in the case of forming inner retaining projections) are formed in the above-mentioned thick-walled portions on both ends which have relatively high rigidity, the amount of deformation of the cage based on pressure applied by knurling is held to a low level, thereby enabling the dimensions of the pockets to maintain high accuracy.

Furthermore, in the constitution of the above-mentioned gate-shaped cross-section, since the roller are guided by the thick-walled portions on both ends of the columns, the tilting or skew of the rollers is held to a low level, thus reducing sliding with the rack surface resulting in reduced generation of heat. In addition, in this gate-shaped cross-section, since the width dimension of the columns along the pitch circle diameter (P.C.D.) of the rollers is relatively small, the number of rollers that can be incorporated can be increased, which in consideration of the high rigidity as previously described, is preferable at times when a high load capacity is required. Incidentally, as is particularly clear from FIG. 9, in the roller and cage assembly shown as an example of the prior art in FIGS. 8 through 12, the central portion of column 101c is bent towards the inside diameter so as to form the letter "M" with the cross-sectional shape of rings 101b on both ends, and for this reason is referred to as an M-shaped roller and cage assembly. In this M-shaped roller and cage assembly, in the case of setting the width dimension of columns 101c along the pitch circle diameter of the rollers to be the same as that of the gate-shaped roller and cage assembly as claimed in the present invention, the number of rollers that can be incorporated is less than that of the present invention. In addition, since columns 101c themselves are thin-walled and bent considerably, rigidity is inhibited, thus making them frequently selected in cases of receiving relatively light loads.

Continuing, the roller and cage assembly according to the present invention has inner retaining projections that prevent the rollers from felling out of the pockets towards the inside. Thus, the rollers are retained by inner and outer retaining projections and are integrated into a single structure with the cage, thereby facilitating easy handling when attaching said roller and cage assembly to a connecting rod and so forth. However, with respect to the indentations formed on the inside of the cage during machining of said inner retaining projections, since the rollers do not make contact with said inner retaining projections as a result of being swung around by centrifugal force during rotation of said roller and cage assembly, there is no need to perform grinding as in the indentations during forming of the outer retaining projections.

Moreover, in the roller and cage assembly according to the present invention, said cage is composed by mutually joining two halves of a pair of half-circular portions. There are two types of the crankshaft shown in FIG. 6, one in which crank pin 5 and weight 7a are separate and one in which they are integrated into a single structure. Although a completely cylindrical, integrally molded cage can be incorporated in the separate type of crankshaft, it cannot be incorporated in an integrated type of crankshaft. If a cage is used that employs a split structure, it can be incorporated in either a separate type of crankshaft or integrated type of crankshaft.

I claim:

1. A roller and cage assembly comprising:

a substantially cylindrical cage, having rings on both ends and a plurality of columns which are arranged integrally with each of said rings in a circumferential direction of said cage so as to define pockets parallel with said columns in an axial direction of said cage; and rollers having a diameter larger than a wall thickness of said cage, said rollers being inserted, respectively, into each of said pockets, wherein said columns include a substantially U-shaped recess, which extends outside a pitch circle diameter of said rollers and which has an axial length shorter than said pockets, said recess being formed at an inside portion of said columns and centered in the axial direction, and said columns further having thick-walled portions on both ends and a thin-walled portion in the center of said columns, wherein said thick-walled portions of said columns include outer retaining projections that are projected into said pockets to prevent said rollers from coming off outwardly, said outer retaining projections being formed by machining a portion of said columns formed thicker than a predetermined outer diameter which functions as a guide surface for an outer diameter surface of said cage after said cage is subjected to cutting, into a recess, wherein an outer circumferential side of said cage is subjected to cutting to remove said recess from said columns, wherein outer surfaces of said outer retaining projections coincide with said predetermined outer diameter which functions as said guide surface for said outer diameter surface of said cage, and wherein an outer surface of said columns is level with an outer circumferential surface of said rings over the entire axial length of said columns.

2. The roller and cage assembly as set forth in claim 1, wherein said columns include notches, said notches enlarge a portion of said pockets, and said notches are formed in the center of said columns in the axial direction and at both sides thereof in the circumferential direction.

3. The roller and cage assembly as set forth in claim 1, further comprising inner retaining projections that prevent said rollers from coming off inwardly, said inner retaining projections being projected into said pockets by machining the inside portion of said columns.

4. The roller and cage assembly as set forth in claim 1, wherein said cage comprises a pair of semi-ring half assemblies that are joined together.

* * * * *